Dec. 21, 1965  G. E. MAFFEY, JR  3,225,230
SPIDER BEARING INSERT FOR INSULATED TOOL
Filed Aug. 13, 1963
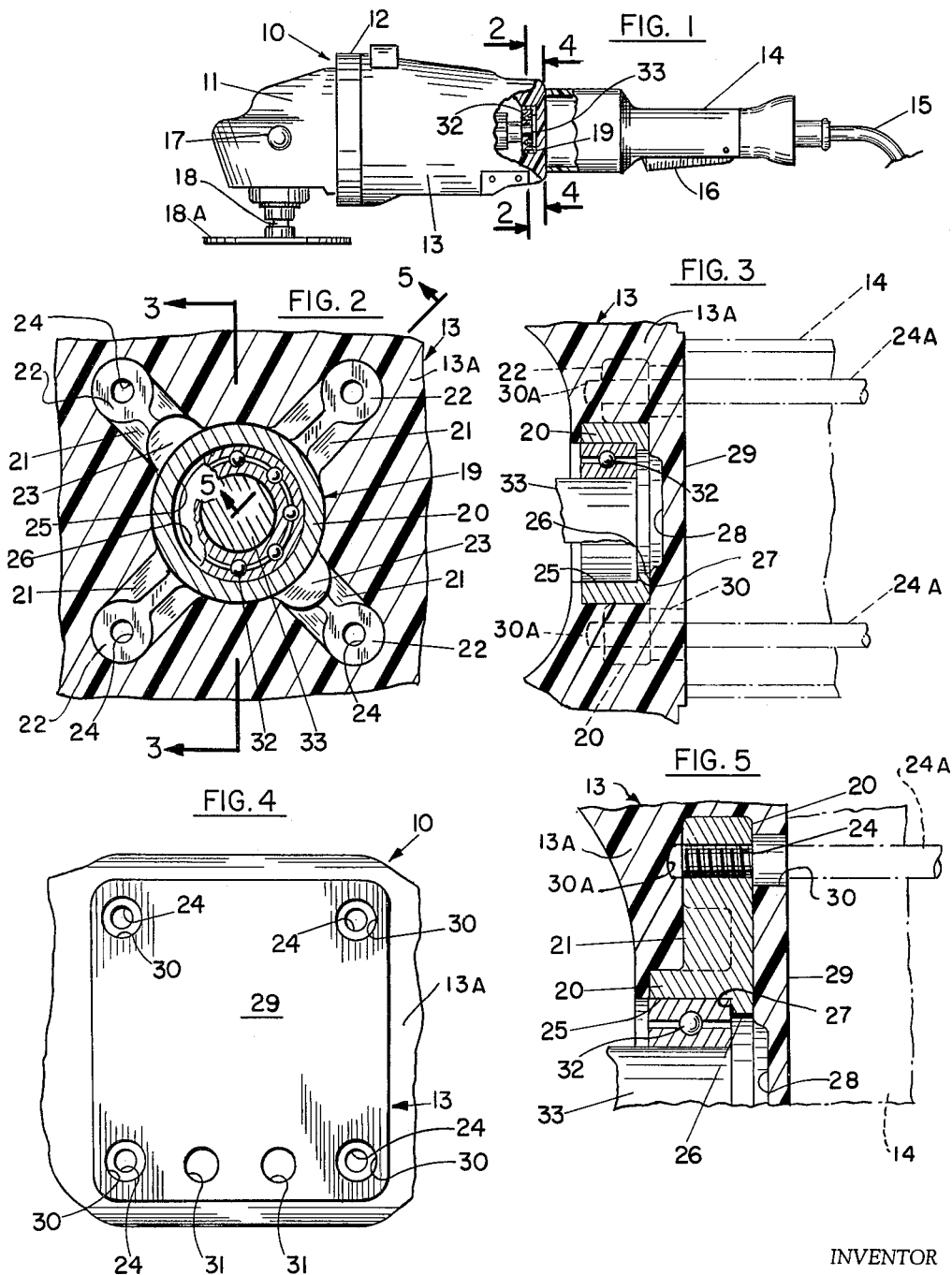
INVENTOR
GEORGE E. MAFFEY, JR.
BY Leonard Bloom
ATTORNEY United States Patent Office 3,225,230
Patented Dec. 21, 1965

1

3,225,230
SPIDER BEARING INSERT FOR INSULATED TOOL
George E. Maffey, Jr., Timonium, Md., assignor to The Black and Decker Manufacturing Company, Towson, Md., a corporation of Maryland
Filed Aug. 13, 1963, Ser. No. 301,788
2 Claims. (Cl. 310—50)

The present invention relates to a spider bearing insert for an insulated tool, and more particularly, to a one-piece integrally molded insert which serves a dual function: one, to form a seat for a suitable antifriction bearing, and secondly, to provide a convenient means for securing a pair of housing together, at least one of which is molded from a suitable insulating material.

It is an object of the present invention to provide means including a one-piece integrally-molded spider bearing insert for securing a pair of housings together, wherein the insert facilities the clamping of a relatively large mass of material between the two housings, so as to readily absorb the required compressive stresses involved in securing the housings together.

It is another object of the present invention to facilitate the usage of a single economical piece in lieu of several separate pieces, yet simultaneously, to obtain the benefit of increased strength and rigidity in the overall assembled structure.

It is yet another object of the present invention to provide an integrally-molded spider bearing insert which facilitates the economical manufacture of high quality fully insulated portable electric tools.

In accordance with the broad teachings of the present invention, there is herein illustrated and described, for use in conjunction with a portable electric tool having a pair of housings secured together, at least one of which is molded from a suitable insulating material, a spider bearing insert comprising a hub integrally molded within the one housing and having a bearing seat formed therein. A plurality of arms, spaced one from another, project from the hub and are integrally molded within the one housing. Each of the arms has a recess formed in the end thereof, and each of the recesses is accessible externally of the one housing. Consequently, suitable fastening means may be provided to pass through at least a portion of the other housing and through the respective recesses in the arms for securing the housings together.

In accordance with the specific teachings of the present invention, there is herein illustarted and described for use in conjunction with a fully insulated portable electric tool of the type having a molded end handle-secured to a molded motor housing, a spider bearing insert which comprises an annular hub integrally molded within an end wall of the motor housing. The hub has an axial bore formed therein and further has an inwardly directed annular shoulder forming a bearing seat rearwardly of the bore. A plurality of integrally formed arms project radially from the hub, circumferentially spaced with respect to each other, and are integrally molded within the end wall of the motor housing. A boss is formed on the end of each of the arms, and each of the bosses has a tapped recess formed therein on an axis which is substantially parallel to the axis of the bearing seat. An external relief is formed in the end wall of the motor housing for each of the tapped recesses, and the reliefs are circumferentially aligned with the respective recesses, such that the recesses are accessible externally of the molded motor housing. A plurality of screws are provided, one for each of the tapped recesses, and each of the screws pass through the molded end handle and through a respective relief in the end wall of the motor housing to engage its

2 respective tapped recess, thereby securing the housings together.

These and other objects of the present invention will become apparent from a reading of the following specification, taken in conjunction with the enclosed drawings, in which:

FIGURE 1 is a side elevation of a typical insulated portable electric tool with which the teachings of the present invention may find particular utility, part of the molded motor housing being broken away to illustrate the integrally molded one-piece spider bearing insert:

FIGURE 2 is a section view taken along the lines 2—2 of FIGURE 1, and enlarged over the scale of FIGURE 1, to illustrate the spider bearing insert integrally molded within the end wall of the molded motor housing;

FIGURE 3 is a section view taken along the lines 3—3 of FIGURE 2, showing the manner in which the annular hub of the spider bearing insert forms a seat for an antifriction bearing;

FIGURE 4 is a view taken along the lines 4—4 of FIGURE 1, enlarged over the scale of FIGURE 1, showing the substantially planar face of the end wall of the motor housing, and further showing the plurality of respective reliefs formed in the motor housing for each of the tapped recesses formed in the arms of the spider bearing insert; and FIGURE 5 is a detail section view taken along the lines 5—5 of FIGURE 2, enlarged over the scale of FIGURE 2, and illustrating the interconnection between the end handle and the molded motor housing.

With reference to FIGURE 1, there is illustrated a fully-insulated portable electric sander with which the teachings of the present invention may find particular utility. It will be appreciated and understood by those skilled in the art, however, that the teachings of the present invention are equally applicable to a wide variety of tools and devices, and that the specific embodiment herein illustrated is not intended to limit the scope of the invention. With this in mind, the sander comprises a gear case 11 and gear case cover 12, a motor housing molded from a suitable insulating material, such as a glass fiber reinforced polyester resin, the motor housing being secured rearwardly of the gear case cover, an end handle 14 secured to the motor housing in accordance with the teachings of the present invention, an electric line cord 15 entering the rear of the handle, a "paddle" type of switch 16 mounted within the end handle for energizing the tool, a side handle 17 secured to the gear case for assisting in the manipulation and control of the tool, a tool spindle 18 driven by the electric motor, an abrasive disc 18a (or other tool element) driven by the spindle, and the one-piece spider bearing insert 19 of the present invention integrally molded within an end wall of the motor housing.

With reference to FIGURES 2, 3, 4, and 5, the spider bearing insert, which is integrally molded within the end wall 13a of the motor housing, comprises an annular hub 20 and a plurality of integrally formed, radially projecting arms 21 circumferentially spaced with respect to each other. Preferably, as shown in FIGURE 2, there are four radially projecting arms spaced at right angles to one another. A boss 22 is formed on the end of each of the arms, and two of the arms, see FIGURE 2, have respective ledges 23 adjacent to the annular hub. Each of the bosses has a tapped recess 24 formed therein along an axis which is substantially parallel to the bore 25 formed in the annular hub. The hub is provided with an inwardly directed annular shoulder 26 which forms a bearing seat 27 rearwardly of the bore. Preferably, an axial clearance 28, see FIGURES 3 and 4, is provided between the annular shoulder and the end wall of the moulded motor housing. The molded end wall has a rearward face 29, see FIGURE 4, which is substantially planar and is formed along an axis substantially at right angles to the axis of rotation of the motor shaft. The end wall further has a plurality of external reliefs 30 formed therein, one for each of the tapped recesses in the spider bearing insert and circumferentially aligned with the respective recesses, such that the tapped recesses are accessible externally of the motor housing. A plurality of screws 24a are provided, one for each of the tapped recesses; and each of the screws, see FIGURES 3 and 5, pass through the end handle and through a respective relief in the end wall of the molded motor housing to engage a respective tapped recess formed in the arms of the spider bearing insert, thereby securing the two housings together. Preferably, a further relief 30a, see FIGURE 5, is formed in the motor housing for each of the recesses and forwardly thereof, such that a sufficient clearance and chip disposal is provided when the recesses 24 are tapped. Moreover, the end wall of the motor housing has a pair of holes 31 formed therein, see FIGURE 4, for the passage of the usual electrical conductors (not shown) which pass therethrough to the motor. The bore 25 and bearing seat 27 are used to retain an antifriction bearing 32, which is preferably of the ball type, and the bearing is used to journal the motor shaft 33.

During the molding process, the annular hub may be partially filled with insulating material, but this is of no concern inasmuch as any excess material is removed in the subsequent process of machining the bore and the bearing seat. Moreover, the other housings, namely the gear case, gear case cover, and end handle, are preferably molded from insulating material, while the entire tool is of the double insulated type of design.

Obviously, many modifications may be made without departing from the basic spirit of the present invention, and therefore, within the scope of the appended claims the invention may be practiced other than has been specifically described.

I claim:
1. In a portable electric tool, the combination of a pair of axially disposed housings having respective surfaces abutting one another, at least one of the housings being molded from an insulating material, a spider bearing insert molded within the one housing, said insert being fully enclosed within the one housing and being spaced axially from the respective abutting surfaces, said insert comprising a hub having a bearing seat formed therein, said insert further comprising a plurality of arms formed integrally with the hub and projecting radially therefrom, the arms being arranged circumferentially of one another, substantially equally spaced from one another, and generally defining therebetween an outer periphery of said insert, the respective abutting surface of the other of the housings having a respective outer periphery which is closely spaced, radially, from the outer periphery of said insert, each arm of said insert having a tapped aperture formed in its end, and screws passing through the housings and being received within the tapped apertures, respectively, whereby the molded insulating material is stressed generally in compression, and substantially to an equal degree, upon tightening of the screws in their respective tapped apertures, and whereby said insert performs the dual function of providing a bearing seat and securing the housings together.

2. The combination described in claim 1, wherein the other of the housings is also molded of insulating material and comprises an end handle for the tool.

References Cited by the Examiner
UNITED STATES PATENTS

| | | | |
|---|---|---|---|
| 1,922,258 | 8/1933 | Packer | 310—40 |
| 2,779,883 | 1/1957 | Schumann | 308—189 |
| 2,810,084 | 10/1957 | Sprando | 310—43 X |
| 2,935,364 | 5/1960 | Smith | 308—189 |
| 3,002,261 | 10/1961 | Avila | 264—272 X |
| 3,121,813 | 2/1964 | Pratt et al. | 310—43 |

CARL W. TOMLIN, *Primary Examiner.*

I. TALTON, C. B. FAGAN, *Assistant Examiners.*